Figure 1:
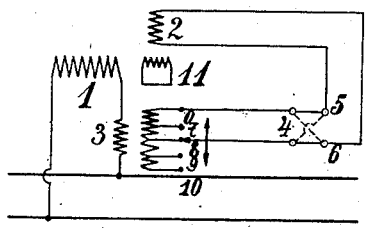

G. WINTER & F. EICHBERG.
CONTROLLING SYSTEM FOR ALTERNATING CURRENT MACHINES.
APPLICATION FILED MAR. 7, 1903.

1,073,200.

Patented Sept. 16, 1913.

3 SHEETS—SHEET 1.

Witnesses:

Inventors:
Gabriel Winter
Friedrich Eichberg

G. WINTER & F. EICHBERG.
CONTROLLING SYSTEM FOR ALTERNATING CURRENT MACHINES.
APPLICATION FILED MAR. 7, 1903.
1,073,200.  Patented Sept. 16, 1913.
3 SHEETS—SHEET 2.
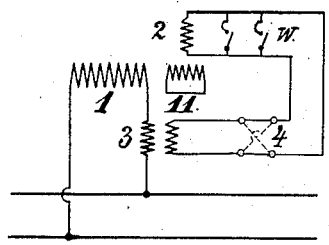
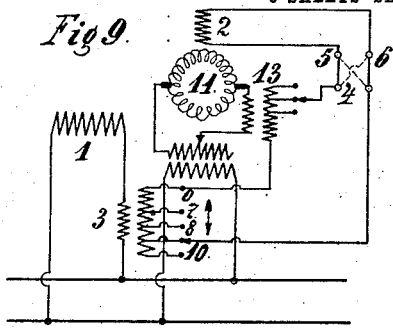
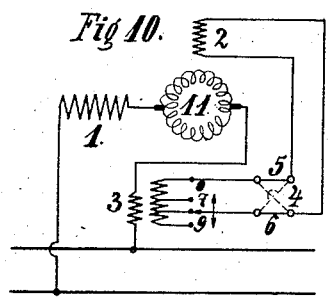
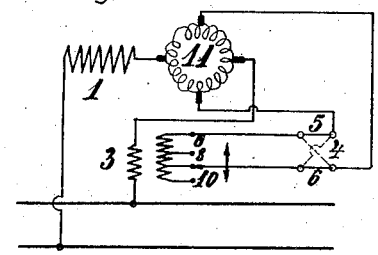
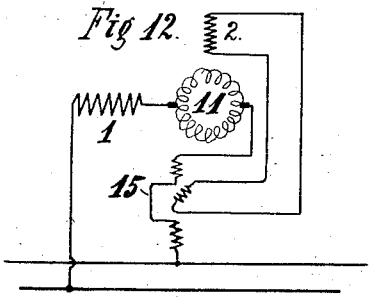
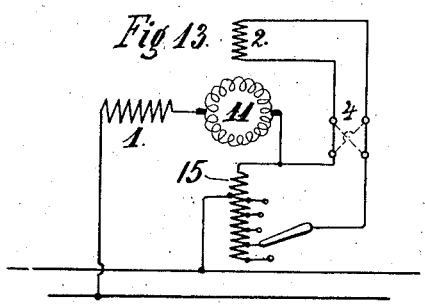
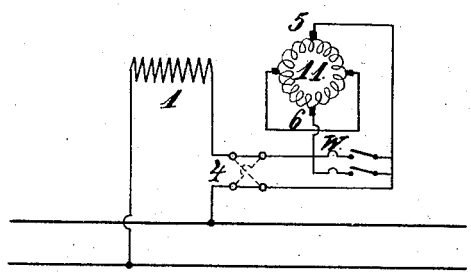

G. WINTER & F. EICHBERG.
CONTROLLING SYSTEM FOR ALTERNATING CURRENT MACHINES.
APPLICATION FILED MAR. 7, 1903.

1,073,200.

Patented Sept. 16, 1913.

3 SHEETS—SHEET 3.

Witnesses.

Inventors.
Gabriel Winter.
Friedrich Eichberg.
by
Atty.

UNITED STATES PATENT OFFICE.

GABRIEL WINTER, OF VIENNA, AUSTRIA-HUNGARY, AND FRIEDRICH EICHBERG, OF BERLIN, GERMANY, ASSIGNORS TO GENERAL ELECTRIC COMPANY, A CORPORATION OF NEW YORK.

CONTROLLING SYSTEM FOR ALTERNATING-CURRENT MACHINES.

1,073,200.  Specification of Letters Patent.  Patented Sept. 16, 1913.

Application filed March 7, 1903. Serial No. 146,692.

*To all whom it may concern:*

Be it known that we, GABRIEL WINTER and FRIEDRICH EICHBERG, subjects of the Emperor of Austria-Hungary, residing at Vienna, Austria-Hungary, and at Berlin, Germany, respectively, have invented certain new and useful Improvements in Controlling Systems for Alternating-Current Machines, of which the following is a specification.

The systems known up to now for controlling alternating current machines running with variable speed consist in changing the voltage on the machine by series parallel connection or by resistances connected with the stator- or rotor-winding. Controlling was also performed by connecting the machine with a transformer or an autotransformer with variable secondary voltage, or, in arrangements in which the magnetizing currents are supplied from a different circuit from that supplying the energy currents, as disclosed in our application for United States Letters Patent, Serial No. 111,180, filed June 11th, 1902, the control may be obtained by varying the magetizing currents. In this latter case the magnetizing circuit was put on a higher voltage or the resistance of this circuit was diminished for lowering the speed. On the other hand the voltage on the magnetizing circuit has to be decreased or the resistance increased if the speed should be higher.

The methods described in the following refer especially to the arrangements according to our application for United States Patent Serial No. 111,180 filed June 11th, 1902.

Our present system has the unique characteristic that the number of transformer turns connected to the motor circuit, which supplies the magnetizing current for the motor, will be enlarged for increasing the speed of the machine, and will be diminished for decreasing the speed; whereas, in former arrangements in which the voltage of magnetizing current is independent of the amount of energy current, the reverse has been the case.

This system is applicable for all monophase or polyphase alternating current machines in which the windings exciting the magnetic field form a separate circuit. If in this case the excitation is derived from one or more series-transformers inserted in one or more of these circuits which convey the working currents, the increase of the ratio of transformation will decrease the total impedance of the circuit. By this coöperation the characteristic qualities of this system are produced. Decreasing the voltage on the exciting circuit to zero, the motor will stop or if running as a generator, will not give any electric energy to the system.

Figure 2:
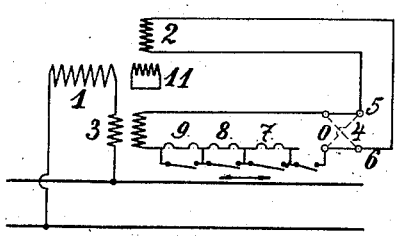
Figure 3:
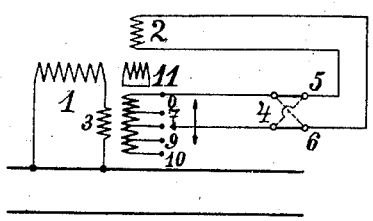
Figure 4:
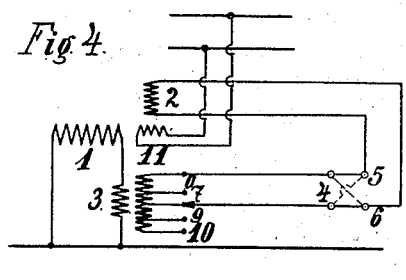
Figure 5A:
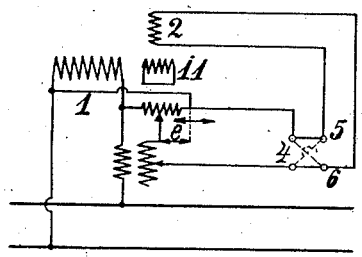
Figure 5B:
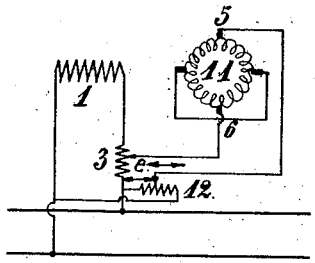
Figure 6:
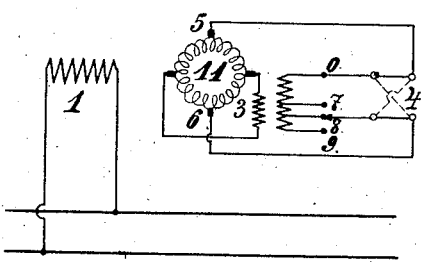
Figure 7:
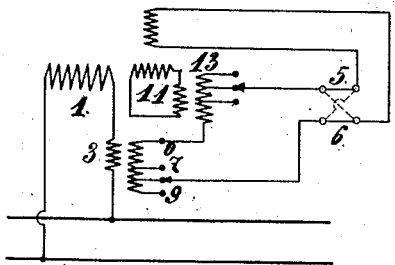
Figure 15:
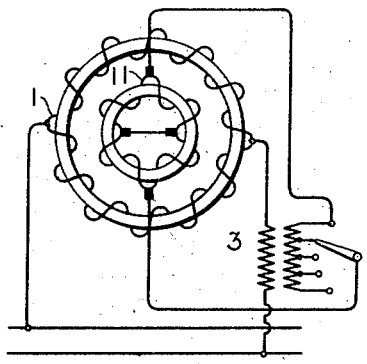
Figure 16:
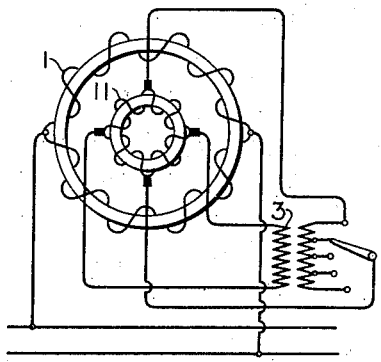
Figure 17:
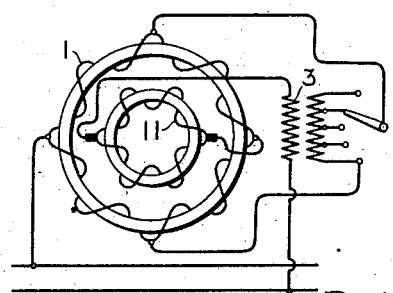
Figure 18:
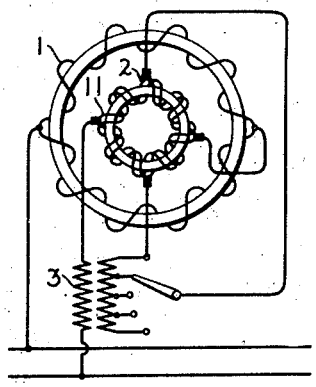
Figure 19:
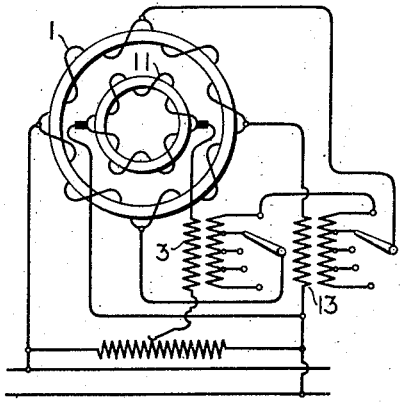

In the accompanying drawings, Figure 1 shows diagrammatically a motor and circuits arranged in accordance with our invention. Fig. 2 shows a modification of the same. Figs. 3 and 4 show the primary member of the motor connected for braking. Figs. 5ª and 5ᵇ show potential transformers combined with the series transformers of the preceding figures. Fig. 6 shows the series transformer inserted in circuit with the secondary member of the motor. Fig. 7 shows series transformers in circuit with both members. Fig. 8 shows another arrangement for controlling the exciting current. Fig. 9 shows another arrangement of circuit connections. Figs. 10 and 11 show other arrangements of the motor circuits. Fig. 12 shows an induction regulator substituted for the series transformer of the preceding figures. Fig. 13 shows an autotransformer used as series transformer. Fig. 14 shows an arrangement in which all transformers are omitted. Fig. 15 shows the arrangement of Fig. 1 applied to one of the forms of motor described in our application of June 11, 1902, Serial No. 111,180, heretofore mentioned. Fig. 16 shows the arrangement of Fig. 6 applied to one of the forms of motor described in the said application. Figs. 17 and 18 show the arrangements of Figs. 10 and 11 respectively, applied to one of the forms of motor described in said application. Fig. 19 shows the arrangement of Fig. 9 applied to another form of motor described in said application.

In the following the system is described for the special case of monophase motors.

Referring to Fig. 1, 1 is the primary winding system situated on the stator or rotor which is connected to the source of current. 11 is the secondary winding on rotor or stator which, in Fig. 1, is shown short-circuited. 2 is the exciting winding which may also be situated on the stator or rotor. The special arrangement of the motor is of no account. 3 is a series transformer with variable secondary voltage; it also may be an autotransformer or an induction-regulator. 4 is a commutating switch, which may be hand-operated or controlled in any well-known manner and which, by its operation, reverses the direction of rotation of the motor by shifting the magnetization of the motor in one direction or the other.

It is evident from the well known principles of series transformer action, that an increase in the number of turns of the transformer secondary connected to winding 2 will produce a decrease in current flow and a consequent weakening of the field of winding 2. The counter-electromotive force developed in the winding 11, due to its rotation in the field of winding 2, consequently is decreased, and the motor must speed up to restore the balance of electromotive forces. This action, as has been already stated, is the reverse of that in previous arrangements in which the exciting winding has been energized from a transformer connected to a constant potential source.

If the motor is to stop the two terminals 5, 6, of the exciting winding may be connected in point 0. The transformer will then work as an inductive coil and the current taken from the line will be very small. If point 6 is connected successively to points 7, 8, 9, 10 the torque being constant, then the motor will increase its speed also successively. The same result could be obtained with constant secondary voltage on the transformer in the way shown in Fig. 2, that means in operating directly or by relays the switches 0, 7, 8, 9 gradually. All of these regulating methods may also be used for the controlling of the short-circuit-braking for which purpose the winding 1 is short-circuited (see Fig. 3) or for running from the low-tension-side the high tension winding 1 being short-circuited (see Fig. 4). In this figure it has to be understood that the winding 11 is a low-tension winding, winding 1 being a high tension winding. If several motors are to be controlled it is possible to connect the exciting winding systems in series or parallel and it is also possible to connect the working circuits in series or parallel.

We do not claim in this application the braking connection above mentioned, since this forms the subject-matter of a later application, which has issued as Patent No. 792,103, dated June 13, 1905.

It is not necessary that the exciting circuit is fed by a series transformer only; it is possible as shown in Figs. 5ª and 5ᵇ to insert in this circuit a voltage derived directly from the voltage on the winding system 1 or from the voltage on the line or from any combination of them without annihilating the characteristic qualities of this system. By such a combination, not only the amount of the voltage impressed on magnetizing winding 2, but also the phase of that voltage may be controlled, thereby modifying without destroying the characteristics of the system. Either series or potential transformer may be cut out entirely, or variable parts of either or both included in circuit, as shown in the figures. For a given current flow through the magnetizing winding, it is evident that the maximum torque is obtained when the current and consequently the field are in phase with the currents in the other winding. This condition is obtained by the use of a series transformer. By the introduction of a potential transformer, the phase of the current in the magnetizing winding, and consequently the torque and speed of the motor, may be altered. Whereas in the preceding figures the windings 1, 2 and 11 have been shown purely diagrammatically, since any one of these windings may be on either rotor or stator, in Fig. 5ᵇ the winding 11 is indicated as a rotor winding provided with short-circuiting commutator brushes arranged on the line of magnetization produced by the primary winding 1, and the winding 2 in the former figures is combined with the winding 11, the magnetizing current being supplied to the winding 11 by a second set of commutator brushes displaced 90 electrical degrees from the first set. In Fig. 6 the exciting circuit is fed by a series transformer inserted in circuit 11. In Fig. 7 the excitation is produced by two series transformers, one of them (3) inserted in the winding circuit 1, the second (13) inserted in the winding circuit 11.

In Figs. 1 to 7 the speed regulation is performed either by changing the voltage of the transformers or by changing of the series resistances. The same idea is carried out in Fig. 8 by using parallel resistances gradually decreased for increasing the speed and on the other hand gradually increased for decreasing the speed.

In Fig. 9 the winding system 11 is connected with the counter voltage derived from the total line voltage and the amount of current flow in winding 11, and consequently the motor torque, is controlled by varying the counter impressed voltage. In Figs. 10 and 11 the winding-systems 1 and 11 are connected in series the excitation circuit being arranged either as an independent winding on the stator or rotor (see Fig. 10) or combined with the rotor winding (see Fig. 11).

In Fig. 12 an induction regulator 15 is used for modifying the secondary voltage. In this case no reversing switch is necessary. The voltage being changed from the positive maximum through zero to the negative maximum by the movement of the secondary part of the induction regulator.

In Fig. 13 an autotransformer is used instead of a transformer with two windings. In Fig. 14 another case of controlling by paralleling resistances is shown.

In Fig. 15 we have shown the arrangement of Fig. 1 applied to one of the forms of motor described in our application of June 11, 1902, Serial No. 111,180. In Fig. 15 winding 1 is shown mounted on the stator of the motor and connected to the source of current. The winding 11 is the secondary winding placed on the rotor and short-circuited by means of brushes on the line of magnetization of winding 1. Winding 2, which is the exciting or magnetizing winding, is in this arrangement combined with winding 11, and produces a magnetization at right angles to that of the currents in the stator winding 1. The amount of magnetizing current is controlled through the series transformer 3, as in the arrangement of Fig. 1.

Fig. 16 shows the arrangement of Fig. 6 applied to one of the forms of motor described in the above mentioned application. The rotor member 11 is short-circuited through the primary winding of the series transformer 3, and the magnetizing winding is combined with the rotor winding.

Fig. 17 shows the arrangement of Fig. 10 applied to one of the forms of motor described in the above mentioned application, in which the rotor winding 11 is connected in series with the primary winding 1. The magnetizing winding is combined with the primary winding. Fig. 18 shows a modification of the same in which the magnetizing winding 2 is placed on the rotor, and is independent of the rotor winding. With this arrangement two commutators would be used.

Fig. 19 shows the arrangement of Fig. 9 applied to another form of motor described in the above mentioned application, in which the rotor winding 11 is short-circuited through a variable counter voltage, and the amount of current in the rotor winding controlled thereby. The magnetizing winding, which is combined with the primary winding, is shown as controlled by two transformers, the primaries of which are in series with primary winding 1 and with secondary winding 11 respectively.

From the foregoing it will be plainly seen that the magnetizing winding may be placed either upon the stator or upon the rotor, and that it may be independent from the other windings or combined with one of the other windings. Consequently I desire to be understood that by "magnetizing winding" in the appended claims, I intend to include such windings, whether independent of the other windings or combined therewith.

We claim—

1. In an alternating current motor, a primary winding adapted to be connected to a source of current, a secondary winding provided with a commutator and brushes in inductive relation thereto, a transformer having its primary connected in series with one of said windings, a magnetizing winding connected to the secondary of said transformer, and means for varying the ratio of transformation of said transformer.

2. In an alternating current motor, a primary winding adapted to be connected to a source of current, a secondary winding provided with a commutator and brushes in inductive relation thereto, a transformer having its primary connected in series with one of said windings, means for producing with the current in the secondary of said transformer a magnetization of the motor at an angle to the magnetization produced by said windings, and means for varying the ratio of transformation of said transformer.

3. In an alternating current motor, a primary winding adapted to be connected to a source of current, a secondary winding provided with a commutator and brushes arranged on the line of magnetization of said primary winding, a transformer having its primary connected in series with one of said windings, means for producing with the current in the secondary of said transformer a magnetization of the motor at an angle to the magnetization produced by said windings, and means for varying the ratio of transformation of said transformer.

4. In an alternating current motor, a primary winding adapted to be connected to a source of current, a secondary winding in inductive relation thereto, a transformer having its primary connected in series with one of said windings, a magnetizing winding connected to the secondary of said transformer, and means for varying the ratio of transformation of said transformer.

5. In an alternating current motor, a primary winding adapted to be connected to a source of current, a secondary winding provided with a commutator and brushes in inductive relation thereto, a transformer having its primary connected in series with one of said windings, a magnetizing winding adapted to produce a magnetization of the motor at an angle to the magnetization of the first mentioned windings and connected to the secondary of said transformer, and means for varying the ratio of transformation of said transformer.

6. In an alternating current motor, a primary winding adapted to be connected to a source of current, a secondary winding in inductive relation thereto, a transformer having its primary connected in series with one of said windings, a magnetizing winding adapted to produce a magnetization of the motor at an angle to the magnetization of the first mentioned windings and connected to the secondary of said transformer, and means for varying the ratio of transformation of said transformer.

7. In an alternating current motor, a primary winding adapted to be connected to a source of current, a secondary winding in inductive relation thereto, a transformer having its primary connected in series with one of said windings, a potential transformer, a magnetizing winding, and means for connecting said magnetizing winding to variable portions of the secondaries of said transformers.

8. In an alternating current motor, a winding adapted to be connected to a source of current, a transformer having its primary in series with said winding, a potential transformer, a winding adapted to produce a magnetization at an angle to the magnetization produced by the first named winding, and means for connecting the last named winding to variable portions of the secondaries of said transformers.

9. In an alternating current motor, a primary winding adapted to be connected to a source of current, a secondary winding in inductive relation thereto, a transformer having its primary connected in series with one of said windings, means for connecting the secondary of said transformer to points on one of said windings intermediate the terminals thereof, and means for varying the ratio of transformation of said transformer.

10. In an alternating current motor, a primary winding adapted to be connected to a source of current, a secondary winding in inductive relation thereto and connected in series therewith, a transformer having its primary connected in series with said windings, and a magnetizing winding connected to the secondary of said transformer.

11. In an alternating current motor, a primary winding adapted to be connected to a source of current, a secondary winding in inductive relation thereto and connected in series therewith, a transformer having its primary connected in series with said windings, a magnetizing winding connected to the secondary of said transformer, and means for varying the ratio of transformation of said transformer.

12. In an alternating current motor, a primary winding adapted to be connected to a source of current, a secondary winding in inductive relation thereto, a magnetizing winding, and means for energizing said magnetizing winding by a variable portion of the current in one of the first named windings.

13. In an alternating current motor, a primary winding adapted to be connected to a source of current, a secondary winding in inductive relation thereto, a transformer having its primary in series with said primary winding, means for connecting the secondary of said transformer to points on the secondary winding of the motor intermediate the terminals thereof, and means for varying the ratio of transformation of said transformer.

14. In an alternating current motor, a distributed winding adapted to be connected to a source of single-phase current, a secondary winding having a system of brushes short-circuited on the line of the primary field and a second system of brushes displaced by ninety electrical degrees from the first system, a series transformer having its secondary connected to said second system of brushes and its primary connected in series with the primary winding of the motor, and means for varying the ratio of transformation of the said series transformer 15. In an alternating-current motor, two windings adapted to produce magnetizations at an angle of 90 degrees to each other, one of said windings being connected to a source of current, a regulating transformer having its primary in series with said winding and its secondary connected to the other winding, and a third short-circuited winding in inductive relation to one of said windings and relatively movable thereto.

16. In an alternating-current motor, a winding connected to a source of current, a regulating transformer having its primary in series therewith, a second winding connected to the secondary of said transformer and adapted to produce a magnetization displaced 90 electrical degrees from that of the first winding, and a third winding in inductive relation to one of the first windings and relatively movable thereto.

17. In an alternating-current motor, a stator winding, a rotor winding provided with a commutator and brushes arranged on the line of magnetization of the primary stator winding, a transformer in series with one of said windings, means for producing with the current in the secondary of said transformer a magnetization of the motor at an angle to the magnetization produced by said windings, and means for varying the ratio of transformation of said transformer.

In testimony whereof we have hereunto set our hands in presence of two subscribing witnesses.

GABRIEL WINTER.
FRIEDRICH EICHBERG.

Witnesses as to Gabriel Winter:
  ALVESTO S. HOGUE,
  AUGUST FUGGER.

Witnesses as to Friedrich Eichberg:
  HENRY HASPER,
  WOLDEMAR HAUPT.

---

Copies of this patent may be obtained for five cents each, by addressing the "Commissioner of Patents, Washington, D. C."